July 21, 1953 R. H. ROMMEL 2,646,451
CONTINUOUS ADSORPTION PROCESS
Filed Nov. 1, 1949 3 Sheets-Sheet 2

INVENTOR.
RICHARD H. ROMMEL
BY
*Busser and Harding*
ATTORNEYS

July 21, 1953 R. H. ROMMEL 2,646,451
CONTINUOUS ADSORPTION PROCESS
Filed Nov. 1, 1949 3 Sheets-Sheet 3

INVENTOR.
RICHARD H. ROMMEL
BY
ATTORNEYS

Patented July 21, 1953

2,646,451

UNITED STATES PATENT OFFICE 2,646,451

CONTINUOUS ADSORPTION PROCESS

Richard H. Rommel, Wilmington, Del., assignor to Sun Oil Company, Philadelphia, Pa., a corporation of New Jersey Application November 1, 1949, Serial No. 124,828

14 Claims. (Cl. 260—674)

This invention relates to the separation of organic compounds by selective adsorption. The invention is directed more particularly to a process wherein a liquid mixture of organic compounds is treated in continuous manner with a particulate or finely divided adsorbent to separate a more adsorbable component from a less adsorbable component. The process is especially useful in the treatment of hydrocarbon fractions, such as gasoline, kerosene, gas oil and lubricating oil, to separate the aromatic from the saturate constituents of the charge.

Various processes have been proposed heretofore for separating liquid organic mixtures, especially hydrocarbon fractions, by means of a selective adsorbent such as silica gel, activated carbon and the like. The usual manner of carrying out such treatment has been to filter the charge through a stationary body of the adsorbent to cause selective adsorption, after which the adsorbent is treated in a suitable manner to remove the adsorbate, or extract as it is sometimes designated, and regenerate the adsorbent for further use. This type of operation has certain disadvantages, such as discontinuity of operation and variation of filtrate composition, which make it more desirable to employ a continuous method of operation.

More recently, continuous processes have been proposed as improvements over the aforesaid type of operation utilizing a stationary adsorbent mass. In the continuous processes the adsorbent generally is circulated through an adsorption zone wherein the charge is continuously treated in liquid phase and then through a desorption zone wherein the extract is removed from the adsorbent, after which the latter is returned to the adsorption zone for re-use. In such operations the adsorbent may be maintained in the form of a moving bed or may be permitted to fall as a shower during its passage through both the adsorption and desorption zones. Processes of this type have been described and claimed in Olsen applications Serial Nos. 84,589, now abandoned, and 84,590, now U. S. Patent No. 2,585,490, filed March 31, 1949, and in Serial Nos. 90,108, now U. S. Patent No. 2,564,716, and 90,109, now abandoned, filed April 28, 1949; and in Ockert applications Serial No. 102,275, now U. S. Patent No. 2,614,133, filed June 30, 1949, and Serial Nos. 111,111, 111,112, 111,113, 111,114 and 111,115, filed August 19, 1949.

Removal of the extract and regeneration of the adsorbent for re-use in a continuous operation may be carried out in several ways. It is well known to treat the used adsorbent with a liquid desorbing agent to displace the extract and then to blow the treated adsorbent with steam, hot air or other inert gas to remove residual desorbing agent before the adsorbent is returned to the adsorption zone. This procedure is somewhat cumbersome and undesirable for commercial practice. It has more recently been found that a simpler and improved way of reconditioning the adsorbent for re-use is merely to treat it with a suitable liquid desorbing agent to displace the extract. The adsorbent, carrying residual desorbing agent as an adsorbed phase, may then be returned directly to the adsorption zone for re-use. Residual desorbing agent thus carried into the adsorption zone is, in turn, displaced from the adsorbent when the latter contacts the raffinate portion of the charge and is removed from the zone along with the raffinate stream. The liquid desorbing agent selected for operating in this manner should, of course, be one which has a boiling point or boiling range sufficiently different from the charge components so that it may readily be separated from them by distillation.

When the reconditioning or regeneration of the used adsorbent is effected merely by employing a liquid desorbing agent as above described, the adsorbability characteristics of the desorbent play an important part in determining the requisite lengths of adsorption and desorption zones, or in other words in determining the number of transfer units required for each of these steps. Where a relatively strong desorbing agent is used, i. e. one which is considerably more strongly adsorbed than the raffinate component of the charge, it will more effectively displace the extract and therefore require less transfer units in the desorption zone; but on the other hand, more transfer units will be needed in the adsorption zone for the raffinate effectively to displace the residual desorbing agent. Where a relatively weak desorbing agent is employed such as one which has an adsorbability about the same as the raffinate component, more transfer units will be required in the desorption zone but less transfer units in the adsorption zone will suffice for displacing the residual desorbing agent.

The present invention is directed to an improved continuous process in which the adsorbate or extract is desorbed by means of a liquid desorbing agent of sufficient adsorbability to effectively remove the extract from the adsorbent without requiring an excessive number of transfer units. Residual desorbing agent is then displaced from the adsorbent in a second desorption zone in a manner, hereinafter more fully described, adapted to reduce the number of transfer units required to complete the reconditioning of adsorbent for further use in treating the charge material.

According to the invention, a selective adsorbent is circulated through a system comprising an adsorption zone where it is countercurrently contacted with the charge in liquid phase, a first desorption zone where it is countercurrently contacted with a liquid desorbing agent of higher adsorbability than the raffinate component of the charge to displace the extract, and a second desorption zone wherein desorbing agent retained from the preceding desorption step is displaced. The last-mentioned desorption is effected by passing the adsorbent countercurrent to a stream comprising raffinate product. This stream may consist of either a recycled portion of the raffinate product derived from the operation or a mixture of such recycled portion together with raffinate stream obtained directly from the adsorption zone.

In a more specific embodiment of the invention, the portion of raffinate product which is recycled to the second desorption zone is introduced therein in heated condition. This results in more effective displacement of residual desorbing agent during the countercurrent treatment of adsorbent within the second desorption zone; and it further reduces the number of transfer units required for reconditioning the adsorbent for reuse.

The invention is particularly useful for the separation of aromatic and saturate hydrocarbons and will be more fully described with reference to such embodiment. Silica gel is an especially effective adsorbent for this purpose, although the process may be practiced with activated carbon or any other adsorbent which will selectively adsorb one of the charge components in preference to the other.

Numerous organic solvents are suitable as the desorbing agent for displacing the aromatic extract during the first desorption step; and one should be selected which has an adsorbability substantially greater than saturate hydrocarbons. The desorbing agent should also have a boiling point or boiling range different from the charge components so that it may readily be separated from them by distillation. It is preferred to employ a desorbent having an adsorbability of the same order of magnitude as the charge aromatics; accordingly, other aromatics or mixtures of aromatics which boil outside of the boiling range of the charge constitute especially useful desorbents. For example, in the treatment of a petroleum fraction such as lubricating oil, gas oil or a naphtha fraction with a boiling range of say 250–400° F., benzene is particularly suited for this purpose. Other aromatics such as toluene, xylenes, etc. which boil either lower or higher than the charge material likewise may be used as the desorbing agent. Numerous non-hydrocarbon organic solvents also have adsorbability characteristics which render them suitable, a few examples being chloroform, chlorbenzene, methylene chloride, n-propylbromide, brombenzene, t-butylchloride and ethylene dichloride; but such materials are more expensive and therefore are generally not preferred. Desorption of the extract can also be effected by means of olefinic hydrocarbons; but desorbents of this type also are not preferred because they have considerably lower adsorbabilities than aromatics and in some instances may have a tendency to polymerize in the presence of the adsorbent.

The invention is more specifically illustrated in the accompanying drawings in which.

With reference to the accompanying drawings, the process will be described for the separation of a charge material composed of aromatic and saturate hydrocarbons such as a naphtha fraction with a boiling range of 250–400° F. For purpose of description, the adsorbent will be referred to as silica gel and the desorbing agent as benzene, although it is to be understood that other selective adsorbents may be used in place of silica gel and that other organic solvents having the characteristics previously set forth for the desorbing agent may be substituted for benzene.

Figure 1:
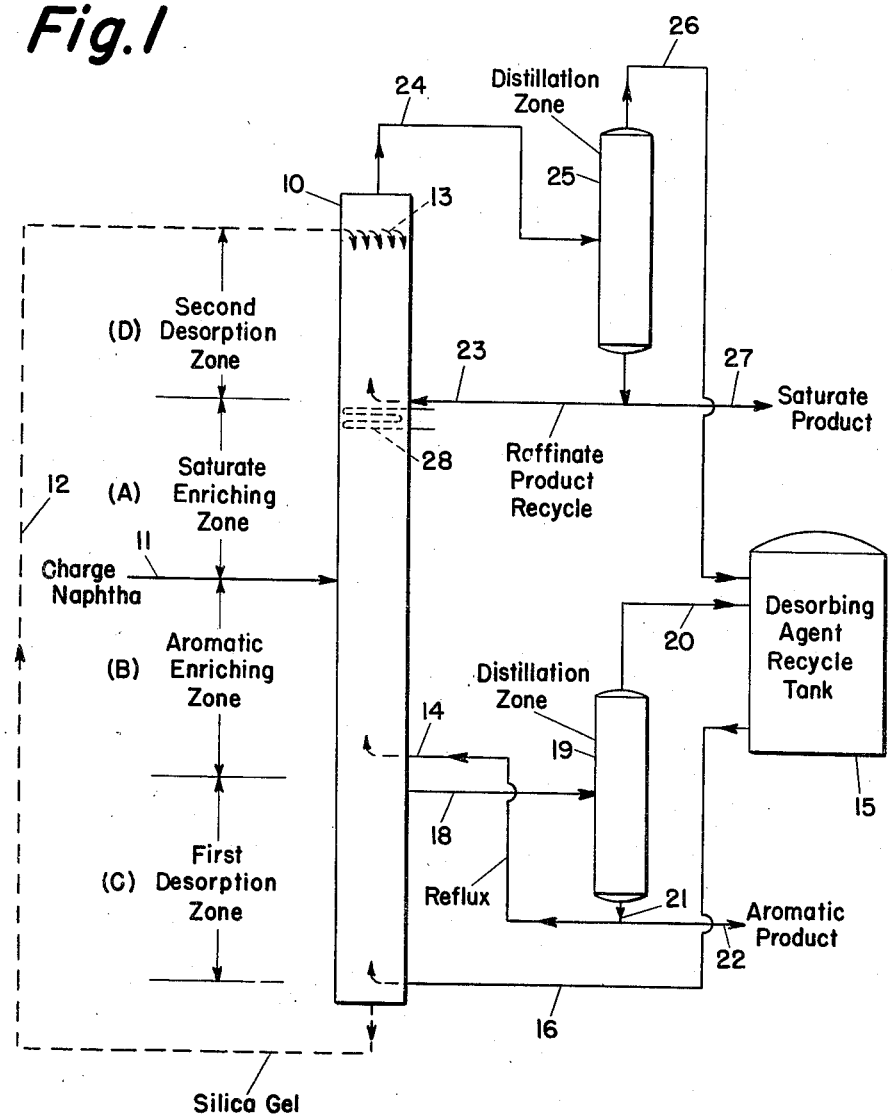
Fig. 1 is a diagrammatic flowsheet illustrating one manner of practicing the process wherein a single column is employed for conducting the several steps of adsorption and desorption.

In Fig. 1, numeral 10 represents an elongated vertical column through which silica gel is continuously circulated from top to bottom. A stream of the charge naphtha is fed into the column at an intermediate level through line 11. The column may be considered to include several different zones as follows: a saturate enriching zone (A) immediately above charge inlet 11; an aromatic enriching zone (B) immediately below the inlet; a first desorption zone (C) adjacent the lower end of the column; and a second desorption zone (D) adjacent its upper end.

Silica gel, carrying residual desorbing agent in adsorbed phase, is continuously withdrawn from the bottom of column 11 and passes directly to the top as indicated by dotted line 12. This may be done in any known or suitable manner, such as by employing bucket elevators or screw conveyors or by utilizing a liquid transporting medium; and it will be understood that the essence of the invention does not reside in the particular mode selected for transporting the adsorbent. The silica gel entering the upper part of the column passes downwardly as indicated by arrows at 13 and may be maintained within the column in the form of a moving compact bed or may be permitted to shower or fall through the liquids within the column.

The charge entering through line 11 flows upwardly in the saturate enriching zone (A) countercurrent to the descending silica gel which selectively adsorbs aromatic constituents of the charge. The silica gel and adsorbate pass downwardly through the aromatic enriching zone (B) wherein purification of the aromatics occurs. This purification is aided by the use of aromatic reflux which is added to the column near the bottom of the enriching zone (B) through line 14. Any desired degree of purification may be secured by having a sufficient number of transfer units in the enriching zone (B) and by using sufficient reflux. The requisite number of transfer units and the reflux ratio may be calculated by known engineering principles.

From the bottom of the aromatic enriching zone (B) the silica gel, carrying aromatic extract in adsorbed phase, enters the first desorption zone (C) and therein passes countercurrent to benzene which is introduced from recycle tank 15 through line 16. A relatively few transfer units in desorption zone (C) will suffice to cause the benzene effectively to displace or desorb the extract. A mixture of benzene and the aromatic extract is withdrawn at a level intermediate zones (B) and (C) through line 18, thence passing into distillation zone 19 for recovery of the benzene. The benzene, being lower boiling than the charge, is distilled overhead and returns via line 20 to recycle tank 15. The aromatic extract is withdrawn from the bottom of distillation zone 19 through line 21, and a portion of it may be returned by means of line 14 to the lower part of the aromatic enriching zone (B) as reflux. The remainder is removed from the system through line 22 as one product of the process.

It is permissible to modify the operation as thus far described by omitting the return of a portion of the aromatic extract through line 14 as reflux. In place of returning reflux to the column in this manner, internal reflux may be obtained by suitable regulation of the rate of withdrawal of the mixture of benzene and aromatic extract at the top of the first desorption section (C). In other words the removal of such mixture through line 18 is so regulated that a portion of it tends to flow upwardly into aromatic enriching zone (B), thus serving as reflux for the aromatic enrichment step. While this method of refluxing may be employed if desired, it is generally less effective than the outside refluxing procedure illustrated in Fig. 1 due to the dilution effect of benzene in the aromatic enrichment zone.

Referring further to Fig. 1, the silica gel which is transferred from the bottom of column 10 back to the top contains residual benzene in adsorbed phase. The purpose of the second desorption zone (D) at the top of the column is to more effectively remove such residual benzene from the silica gel to recondition the latter for further selective adsorption of charge aromatics. This removal is effected by the raffinate stream which flows from saturate enriching zone (A) together with raffinate product which is recycled to the column intermediate zones (A) and (D) by means of line 23. The stream flowing from the top of the column through line 24 is thus composed of charge saturate and benzene and passes to distillation zone 25 for recovery of the benzene, the latter being returned through line 26 to recycle tank 15. A portion of the resulting raffinate is returned to column 10 through line 23, while the remainder is withdrawn from the system through line 27 as the other product of the process.

In a preferred manner of practicing the process, the raffinate material which is returned from distillation zone 25 to column 10 through line 23 is introduced therein in heated form. This may readily be done without providing additional heating means simply by flowing a portion of the hot residuum from the distillation zone directly to column 10 without cooling. The use of hot raffinate recycled in this manner increases its effectiveness for desorbing benzene in zone (D) and therefore reduces the number of transfer units required to accomplish such desorption, or in other words reduces the height of that portion of the column corresponding to zone (D). When the process is practiced in this manner it is preferable to include cooling means in the upper part of saturate enriching zone (A), so as to reduce the temperature of the descending adsorbent. This may be done in any suitable or desired manner, such as by providing cooling coils 28 in the upper part of the saturate enriching zone. Cooling of the adsorbent at this point causes better selectivity for the charge aromatics, thus reducing the number of transfer units required in the enriching zones (A) and (B); and also permits the adsorbent to have a somewhat higher adsorption capacity for the charge hydrocarbons and therefore reduces the amount of adsorbent which must be circulated per unit volume of charge.

Figure 3:
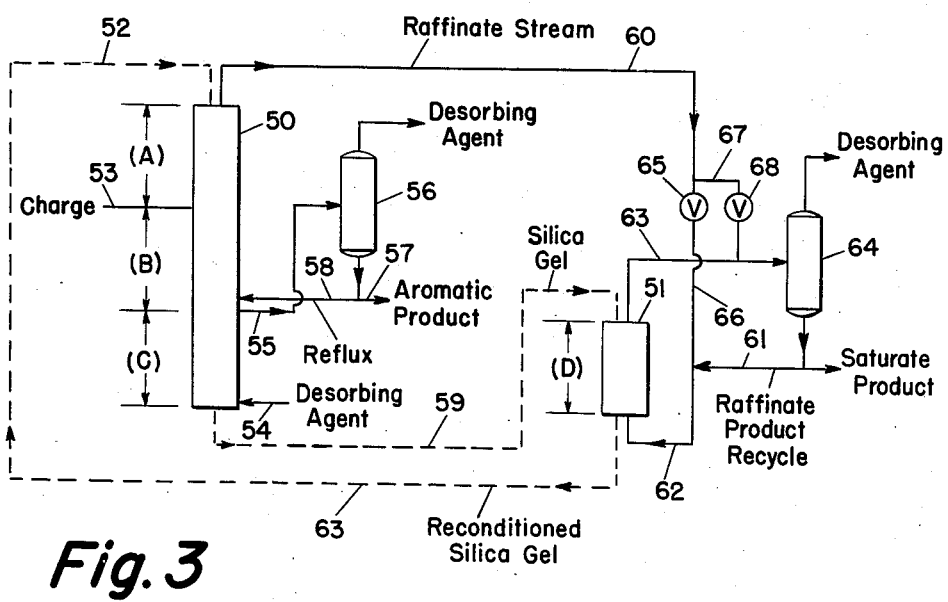
Figure 4:
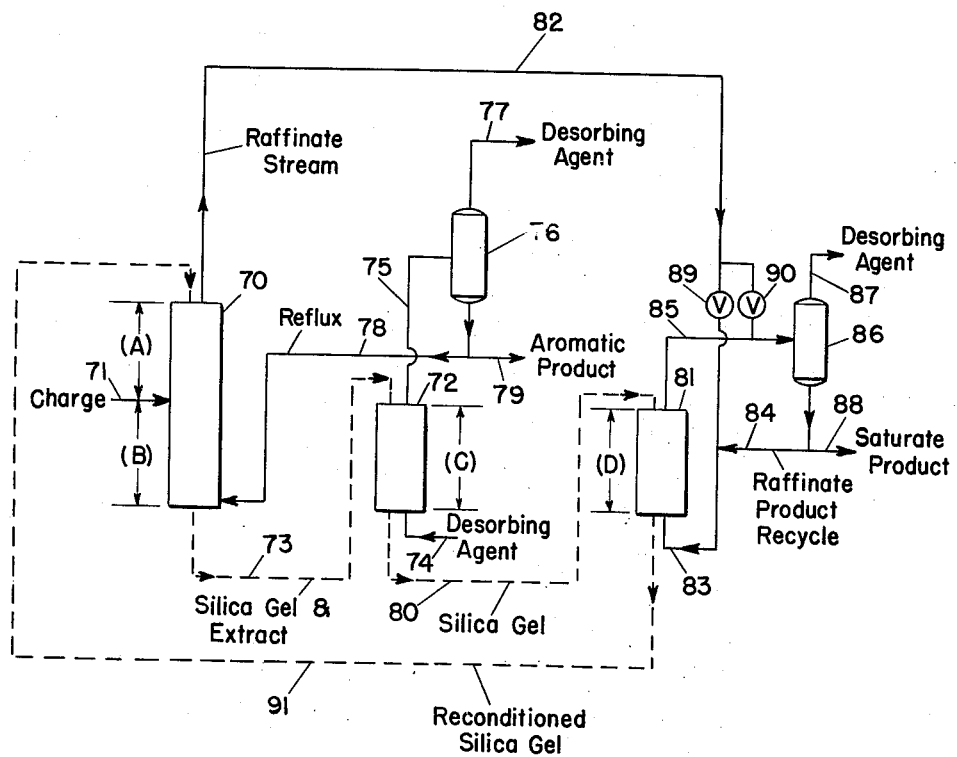

Instead of practicing the process with a single column as illustrated in Fig. 1, the operation may be conducted utilizing a plurality of columns. Several such modifications of the process are illustrated in Figs. 2, 3 and 4.

Figure 2:
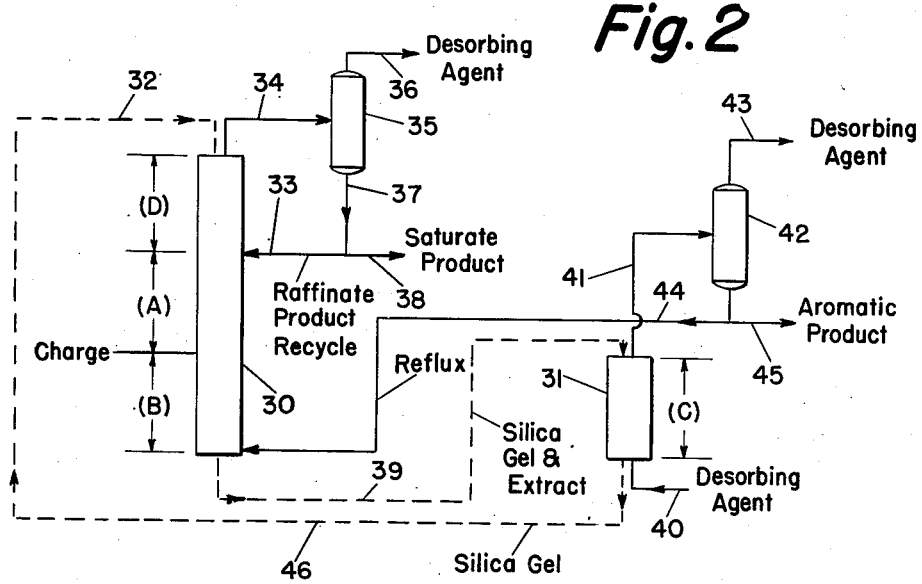
Figs. 2–4 are diagrammatic illustrations of other ways in which the process may be practiced.

Referring to Fig. 2 column 30 is equivalent to the upper three zones shown in Fig. 1. In other words, column 30 has a second desorption zone (D) at the top, an intermediate saturate enriching zone (A) and an aromatic enriching zone (B) at the bottom. A second column 31 constitutes the first desorption zone (C). Circulation of silica gel through the system is indicated by means of dotted lines. The gel enters the top of column 30 through line 32 and passes downwardly through desorption zone (D) countercurrent to the mixture of raffinate stream from enriching zone (A) and raffinate product recycled through line 33. From the top of column 30 a mixture of benzene and charge saturate flows through line 34 to distillation zone 35 from which the benzene is distilled overhead through line 36 while the raffinate product is withdrawn from the bottom through line 37. A portion of the raffinate product is removed from the system through line 38, while the remainder is recycled as above described.

From the bottom of column 30, the silica gel containing aromatic extract in adsorbed phase passes, as shown by dotted line 39, to column 31 wherein it is countercurrently treated with benzene introduced through line 40 at the bottom. A stream of benzene and extract flows from the top of column 31 through line 41 into distillation zone 42. The benzene distills overhead through line 43. A portion of the extract withdrawn from the bottom of distillation zone 42 may be recycled through line 44 to the bottom of column 30 as reflux, while the remainder is removed from the system through line 45 as the other product of the process.

From the bottom of column 31 the silica gel, carrying residual benzene, is returned to the top of column 30 as indicated by dotted lines 46 and 32.

Referring now to Fig. 3, column 50 is equivalent to the three lower zones illustrated in Fig. 1. A separate column designated as 51 is employed as the second desorption zone (D).

Reconditioned silica gel enters the top of column 50 through line 52 and passes downwardly countercurrent to the charge which is introduced through line 53. Benzene is fed through line 54 into the lower part of zone (C) and flows therein countercurrent to the descending silica gel to displace the aromatic extract. The resulting mixture of benzene and extract is removed from the column through line 55 and is then distilled in distillation zone 56. A portion of the benzene-free extract is withdrawn from the system through line 57 while the remainder may be returned as reflux to column 50 through line 58.

The benzene treated silica gel removed from the bottom of column 50 passes to column 51 as indicated by dotted line 59. In column 51 the gel is countercurrently treated with a stream comprising a portion of the raffinate product to displace benzene. This reconditioning treatment may be carried out in several ways. In one manner of operation the raffinate stream from the top of column 50 is sent in toto to the bottom of column 51 by means of line 60, valve 65 and lines 66 and 62, and also a portion of the raffinate product from distillation zone 64 is introduced through lines 61 and 62 into column 51. The treating stream thus consists of a mixture of the entire raffinate stream from the saturate enriching zone (A) and a portion of the raffinate product.

Another way of conducting the operation comprises flowing all of the raffinate stream from column 59 through line 60 into line 67 and thence through valve 68 to distillation zone 64, and introducing only raffinate product into the bottom of column 51 by means of lines 61 and 62. This has the advantage that any benzene carried into the top of column 50 by the reconditioned silica gel and displaced therefrom into the raffinate stream is excluded from the second desorption zone (D), thus improving the desorption efficiency.

Still another way of operation comprises permitting a portion of the raffinate stream from line 60 to pass through valve 65 and lines 66 and 62 to column 51 along with recycled raffinate from line 61, while introducing the remainder through line 67 and valve 68 to distillation zone 64.

The mixture of benzene and saturate obtained from the top of column 51 flows through line 63 to distillation zone 64, along with any of the raffinate stream which may be admitted thereto from line 60, for recovery of the benzene. Reconditioned silica gel from the bottom of column 51 is returned as indicated by dotted line 69 for further use.

The embodiment shown in Fig. 4 utilizes three separate columns for conducting the operation. Column 70 constitutes the saturate and aromatic enriching zones, designated (A) and (B) respectively. The charge is fed into the column through line 71 intermediate the two zones. Silica gel carrying aromatic extract passes from the bottom of column 70 to the top of column 72 as indicated by dotted line 73 and is therein treated with benzene which is introduced through line 74. From the top of column 72 the resulting mixture of benzene and extract is sent through line 75 to distillation zone 76 from which the benzene is removed through line 77. A portion of the benzene-free extract may be returned by means of line 78 to the lower part of the aromatic enriching zone (B), while the remainder is removed as product through line 79.

The silica gel with residual benzene adsorbed thereon passes as indicated by dotted line 80 to the top of column 81 which constitutes the second desorption zone (D) and is therein treated with a stream comprising a portion of the raffinate product by utilizing any of the procedures described in connection with Fig. 3. Thus, a portion of the raffinate product from distillation zone 86 is recycled through lines 84 and 83 to the bottom of column 81, while the raffinate stream flowing from column 70 through line 82 may be sent either to column 81 or to distillation zone 86, or partly to one and partly to the other, by suitable regulation of valves 89 and 90. From the top of column 81 a stream composed of desorbed benzene and charge saturate flows through line 85 to distillation zone 86 from which the benzene is removed through line 87. A portion of the benzene-free raffinate product obtained as residuum is withdrawn from the system through line 88. Reconditioned silica gel is removed from the bottom of column 81 and returned as indicated by dotted line 91 to the top of column 70 for further use.

In addition to the several embodiments above described, the process may also be practiced in other modified forms. For instance, a single column may be used as in Fig. 1 but with the flow lines so arranged that the second desorption zone (D) is at the bottom of the column immediately below the first desorption zone (C). While this procedure would be disadvantageous from the standpoint of requiring careful flow control at the junction of zones (C) and (D) in order to prevent charge saturate from entering the first desorption zone and thus contaminating the aromatic product, it would be advantageous in permitting the adsorbent to be cooled during passage from the bottom of the column to the top, thereby dispensing with any cooling installation within the column itself. Also, since the liquid flow through zone (D) is apt to be relatively high compared to the other zones, it may well be desirable that the portion of column corresponding to such zone have a larger diameter than the other portions; accordingly, an advantage in plant construction may result when zone (D) is located at the bottom.

For purpose of illustrating advantages of the present invention, a comparison may be made between the following processes:

*Case A.*—Using the process of Fig. 1 with benzene as desorbing agent;

*Case B.*—Using benzene as the desorbing agent but omitting any recycle of raffinate product;

*Case C.*—Using a light saturate hydrocarbon (e. g. pentane) as desorbing agent and without recycle of raffinate product.

In each case it is assumed that 100 volumes of a charge, such as a 300–400° F. naphtha, composed of 20% aromatics and 80% saturates by volume is separated into 20 volumes of extract product containing 95% aromatics and 80 volumes of raffinate product containing 1.25% aromatics. Flow rates hereinafter given are based upon each 100 volumes of charge processed.

Case A

Operating the process of Fig. 1 with 100 volumes of benzene as desorbing agent and with 640 volumes of raffinate product recycled to the column, the number of theoretical transfer stages required for effecting the foregoing separation are approximately as follows:

| | |
|---|---|
| Zone (D) | 4 |
| Zone (A) | 2 |
| Zone (B) | 5 |
| Zone (C) | 5 |
| Total | 16 |

Case B

Using 100 volumes of benzene as desorbing agent but without including zone (D) in the process, the approximate number of theoretical transfer stages required are as follows:

| | |
|---|---|
| Zone (A) | 13½ |
| Zone (B) | 6 |
| Zone (C) | 5½ |
| Total | 25 |

This shows that a considerably higher column would be required to make the desired separation than when operating according to the present invention.

Case C

When pentane or other light saturate hydrocarbon is used as the desorbing agent and without utilizing any raffinate product recycle, it is impossible to achieve the specified separation even with an infinite number of theoretical stages unless the amount of pentane employed exceeds about 400. Using 500 volumes of pentane as desorbent, the approximate requirements in theoretical stages are as follows:

Zone (A) _____ 5
Zone (B) _____ 7
Zone (C) _____ 4
                                              —
   Total _____ 16

While under these conditions the column height would be about the same as when practicing the invention according to Fig. 1, the process would be considerably less economic due to heat requirements in distilling the large volume of pentane which, unlike the raffinate product recycled, must be removed as overhead.

While the invention has been described with particular reference to the separation of aromatic from saturate hydrocarbons, it will be understood that the principles of the invention are also applicable to the separation of other organic compounds having different adsorbabilities. Mixtures of such compounds as acids, alcohols, ethers, esters, ketones, halogenated hydrocarbon derivatives, nitro derivatives and the like may be resolved into their constituents in accordance with the invention. In such cases a liquid desorbing agent should be selected which has an adsorbability higher than the raffinate component of the charge, and it is preferred to employ one whose adsorbability is more or less equivalent to that of the extract component.

I claim:

1. Continuous process for separating a liquid mixture of organic compounds of different adsorbabilities by means of a selective adsorbent which comprises feeding particulate adsorbent to an adsorption zone, feeding a liquid stream of the charge mixture into the adsorption zone and flowing it countercurrent to the adsorbent to selectively remove the more adsorbable charge component and yield a raffinate stream rich in the less adsorbable charge component, introducing the used adsorbent, carrying the more adsorbable charge component as adsorbate, into a first desorption zone and therein passing it countercurrent to a liquid desorbing agent to displace said adsorbate from the adsorbent, said desorbing agent boiling outside of the boiling range of the charge mixture and being more highly adsorbable than the less adsorbable charge component, then passing the adsorbent through a second desorption zone countercurrent to a liquid stream comprising raffinate product to displace desorbing agent from the adsorbent, withdrawing from said second desorption zone a mixture of desorbing agent and the less adsorbable charge component, passing said mixture to a distillation zone and therein distilling it to separate desorbing agent and yield raffinate product essentially free of desorbing agent, and maintaining in said second desorption zone a flow ratio of raffinate product to adsorbent higher than such ratio in the adsorption zone by recycling liquid raffinate product from said distillation zone to said second adsorption zone.

2. Process according to claim 1 wherein the said stream comprising raffinate product is a mixture of said raffinate stream from the adsorption zone and the recycled raffinate product.

3. Process according to claim 1 wherein the recycled raffinate product is fed to said second desorption zone in heated condition and reconditioned adsorbent is cooled during passage from said second desorption zone to the adsorption zone.

4. Continuous process for separating a liquid hydrocarbon charge composed of aromatic and saturate hydrocarbons by means of a selective adsorbent which comprises feeding particulate adsorbent to an adsorption zone, feeding a liquid stream of such charge into the adsorption zone and flowing it countercurrent to the adsorbent to selectively adsorb aromatic hydrocarbon and yield a raffinate stream rich in charge saturate, introducing the used adsorbent, carrying aromatic hydrocarbon as adsorbate, into a first desorption zone countercurrent to a liquid desorbing agent to displace charge aromatic from the adsorbent, said desorbing agent boiling outside of the boiling range of the charge and being more highly adsorbable than the raffinate, then passing the adsorbent through a second desorption zone countercurrent to a liquid stream comprising raffinate product to displace desorbing agent from the adsorbent, withdrawing from said second desorption zone a mixture of charge saturate and desorbing agent, passing said mixture to a distillation zone and therein distilling it to separate desorbing agent and yield raffinate product essentially free of desorbing agent, and maintaining in said second desorption zone a flow ratio of raffinate product to adsorbent higher than such ratio in the adsorption zone by recycling liquid raffinate product from said distillation zone to said second adsorption zone.

5. Process according to claim 4 wherein the said stream comprising raffinate product is a mixture of said raffinate stream from the adsorption zone and the recycled raffinate product.

6. Process according to claim 4 wherein the recycled raffinate product is fed to said second desorption zone in heated condition and the adsorbent is cooled during passage from said second desorption zone to the adsorption zone.

7. Continuous process for separating a liquid hydrocarbon charge composed of aromatic and saturate hydrocarbons by means of a selective adsorbent which comprises feeding particulate adsorbent to an adsorption zone, feeding a liquid stream of such charge into the adsorption zone and flowing it countercurrent to the adsorbent to selectively adsorb aromatic hydrocarbon and yield a raffinate stream rich in charge saturate, introducing the used adsorbent, carrying aromatic hydrocarbon as adsorbate, into a first desorption zone and passing it countercurrent to a liquid aromatic desorbing agent which boils outside of the boiling range of the charge to displace charge aromatic from the adsorbent, then passing the adsorbent through a second desorption zone countercurrent to a liquid stream comprising raffinate product to displace desorbing agent from the adsorbent, withdrawing from said second desorption zone a mixture of charge saturate and desorbing agent, passing said mixture to a distillation zone and therein distilling it to separate desorbing agent and yield raffinate product essentially free of desorbing agent, and maintaining in said second desorption zone a flow of ratio of raffinate product to adsorbent higher than such ratio in the adsorption zone by recycling liquid raffinate product from said distillation zone to said second adsorption zone.

8. Process according to claim 7 wherein the adsorbent is silica gel.

9. Process according to claim 7 wherein said stream comprising raffinate product is a mixture of said raffinate stream from the adsorption zone and the recycled raffinate product.

10. Process according to claim 7 wherein the recycled raffinate product is fed to said second desorption zone in heated condition and the adsorbent is cooled during passage from said second desorption zone to the adsorption zone.

11. Continuous process for separating a liquid hydrocarbon charge composed of aromatic and saturate hydrocarbons by means of a selective adsorbent which comprises circulating particulate adsorbent through an elongated column having a first desorption zone at one end, a second desorption zone at the other end, an aromatic enriching zone adjacent said first desorption zone and a saturate enriching zone adjacent said second desorption zone, the adsorbent being withdrawn from the column at the first desorption zone end and being fed directly therefrom into the second desorption zone end, feeding a liquid stream of the charge into the column intermediate said aromatic and saturate enriching zones and flowing the same countercurrent to the adsorbent to selectively adsorb charge aromatic, feeding a liquid desorbing agent which boils outside of the boiling range of the charge into said first desorption zone at a locus remote from said aromatic enriching zone and flowing the same countercurrent to the adsorbent to displace charge aromatic therefrom, said desorbing agent boiling outside of the boiling range of the charge and being more highly adsorbable than the saturate component, withdrawing a stream of desorbing agent and charge aromatic intermediate said first desorption zone and the aromatic enriching zone, withdrawing a mixture of desorbing agent and charge saturate from said second desorption zone adjacent the end where adsorbent is introduced, passing said mixture to a distillation zone and therein distilling it to separate desorbing agent and obtain a saturate product essentially free of desorbing agent, and maintaining in said second desorption zone a flow ratio of saturate product to adsorbent higher than such ratio in the adsorption zone by recycling liquid saturate product from said distillation zone to the column intermediate said second adsorption zone and the saturate enriching zone.

12. Continuous process for separating a liquid hydrocarbon charge composed of aromatic and saturate hydrocarbons by means of a selective adsorbent which comprises circulating particulate adsorbent through an elongated column having a first desorption zone at one end, a second desorption zone at the other end, an aromatic enriching zone adjacent said first desorption zone and a saturate enriching zone adjacent said second desorption zone, the adsorbent being withdrawn from the column at the first desorption zone end and being fed directly therefrom into the second desorption zone end, feeding a liquid stream of the charge into the column intermediate said aromatic and saturate enriching zones and flowing the same countercurrent to the adsorbent to selectively adsorb charge aromatic, feeding an aromatic desorbing agent which boils outside of the boiling range of the charge in liquid phase into said first desorption zone at a locus remote from said aromatic enriching zone and flowing the same countercurrent to the adsorbent to displace charge aromatic therefrom, withdrawing a stream of desorbing agent and charge aromatic intermediate said first desorption zone and the aromatic enriching zone, withdrawing a mixture of desorbing agent and charge saturate from said second desorption zone adjacent the end where adsorbent is introduced, passing said mixture to a distillation zone and therein distilling it to separate desorbing agent and obtain a saturate product essentially free of desorbing agent, and maintaining in said second desorption zone a flow ratio of saturate product to adsorbent higher than such ratio in the adsorption zone by recycling liquid saturate product from said distillation zone to the column intermediate said second adsorption zone and the saturate enriching zone.

13. Process according to claim 12 wherein the adsorbent is silica gel.

14. Continuous process for separating a liquid hydrocarbon charge composed of aromatic and saturate hydrocarbons by means of a selective adsorbent which comprises circulating particulate adsorbent through an elongated column having a first desorption zone at one end, a second desorption zone at the other end, an aromatic enriching zone adjacent said first desorption zone and a saturate enriching zone adjacent said second desorption zone, the adsorbent being withdrawn from the column at the first desorption zone end and being fed directly therefrom into the second desorption zone end, feeding a liquid stream of the charge into the column intermediate said aromatic and saturate enriching zones and flowing the same countercurrent to the adsorbent to selectively adsorb charge aromatic, feeding an aromatic desorbing agent which boils below the boiling range of the charge in liquid phase into said first desorption zone at a locus remote from said aromatic enriching zone and flowing the same countercurrent to the adsorbent to displace charge aromatic therefrom, withdrawing a stream of desorbing agent and charge aromatic intermediate said first desorption zone and the aromatic enriching zone, withdrawing a mixture of desorbing agent and charge saturate from said second desorption zone adjacent the end where adsorbent is introduced, passing the last-named mixture to a distillation zone and therein distilling it to separate desorbing agent and obtain a saturate product essentially free of desorbing agent, maintaining in said second adsorption zone a flow ratio of saturate product to adsorbent higher than such ratio in the saturate enriching zone by recycling liquid saturate product from said distillation zone directly to the column intermediate said second adsorption zone and the saturate enriching zone, said recycled saturate product containing heat supplied during the distillation, and cooling the adsorbent during passage from said second desorption zone to the saturate enriching zone.

RICHARD H. ROMMEL.

References Cited in the file of this patent

UNITED STATES PATENTS

| Number | Name | Date |
|---|---|---|
| 2,384,311 | Kearby | Sept. 4, 1945 |
| 2,398,101 | Lipkin | Apr. 9, 1946 |
| 2,441,572 | Hirschler et al. | May 18, 1948 |
| 2,464,311 | Hiatt et al. | Mar. 15, 1949 |
| 2,470,339 | Claussen et al. | May 17, 1949 |
| 2,582,415 | Claussen | Jan. 15, 1952 |
| 2,585,492 | Olsen | Feb. 12, 1952 |